(12) United States Patent
Kwon et al.

(10) Patent No.: US 11,934,754 B2
(45) Date of Patent: Mar. 19, 2024

(54) MAGNETIC PARAMETER VALUE ESTIMATION METHOD AND DEVICE USING DEEP LEARNING

(71) Applicant: KOREA INSTITUTE OF SCIENCE AND TECHNOLOGY, Seoul (KR)

(72) Inventors: Hee Young Kwon, Seoul (KR); Jun Woo Choi, Seoul (KR)

(73) Assignee: Korea Institute of Science and Technology (KR)

(*) Notice: Subject to any disclaimer, the term of this patent is extended or adjusted under 35 U.S.C. 154(b) by 750 days.

(21) Appl. No.: 17/072,384

(22) Filed: Oct. 16, 2020

(65) Prior Publication Data

US 2021/0365615 A1 Nov. 25, 2021

(30) Foreign Application Priority Data

May 21, 2020 (KR) .................. 10-2020-0060703

(51) Int. Cl.
| | |
|---|---|
| *G06F 30/27* | (2020.01) |
| *G06N 3/04* | (2023.01) |
| *G06N 3/045* | (2023.01) |
| *G06N 3/08* | (2023.01) |
| *G06N 5/01* | (2023.01) |
| *G06N 7/01* | (2023.01) |
| *G06N 20/00* | (2019.01) |
| *H01F 7/02* | (2006.01) |
| *G06F 111/10* | (2020.01) |

(52) U.S. Cl.
CPC .............. *G06F 30/27* (2020.01); *G06N 3/04* (2013.01); *G06N 3/045* (2023.01); *G06N 3/08* (2013.01); *G06N 5/01* (2023.01); *G06N 7/01* (2023.01); *G06N 20/00* (2019.01); *H01F 7/0294* (2013.01); *G06F 2111/10* (2020.01)

(58) Field of Classification Search
CPC ....... G06F 30/27; G06F 2111/10; G06N 3/04; G06N 3/045; G06N 3/08; G06N 5/01; G06N 7/01; G06N 20/00; H01F 7/0294
USPC .......................................................... 703/2
See application file for complete search history.

(56) References Cited

U.S. PATENT DOCUMENTS

2021/0311146 A1* 10/2021 Keenan ................ G01R 33/385

OTHER PUBLICATIONS

Salcedo-Gallo, J. S., C. C. Galindo-González, and E. Restrepo-Parra. "Deep learning approach for image classification of magnetic phases in chiral magnets." Journal of magnetism and magnetic materials 501 (2020): 166482. pp. 1-6. (Year: 2022).*

* cited by examiner

*Primary Examiner* — John E Johansen

(74) *Attorney, Agent, or Firm* — Mendelsohn Dunleavy, P.C.

(57) ABSTRACT

Disclosed is a magnetic parameter value estimation method using deep learning, the magnetic parameter value estimation method including creating a simulated magnetic domain image corresponding to a spin configuration of a two-dimensional magnetic system created through computer simulation, modeling a deep neural network using the simulated magnetic domain image, and estimating a magnetic parameter value of an observed magnetic domain image using the modeled deep neural network.

5 Claims, 9 Drawing Sheets
(4 of 9 Drawing Sheet(s) Filed in Color)

Without DMI ($\beta_N = 0.5$)

With DMI ($\beta_N = 1$)

$\beta_N = 0.5$ $S_x$     $S_y$     $S_z$

MAGNETIC PARAMETER VALUE ESTIMATION METHOD AND DEVICE USING DEEP LEARNING

STATEMENT OF GOVERNMENTAL SUPPORT

This invention was made with government support under Project No. CAP-16-01-KIST awarded by Creative Allied Project (CAP) through the National Research Council of Science & Technology (NST) funded by the Ministry of Science and ICT. The government support was made at a contribution rate of 50/100 for the research period of Jul. 1, 2019 through Jun. 30, 2020. The supervising institute was KOREA INSTITUTE OF SCIENCE AND TECHNOLOGY.

This invention was additionally made with government support under Project No. NRF-2019R1A6A3A01091209 awarded by Basic Science Research Program through the National Research Foundation of Korea (NRF) funded by the Ministry of Education. The government support was made at a contribution rate of 40/100 for the research period of Sep. 1, 2019 through Aug. 31, 2020. The supervising institute was KOREA INSTITUTE OF SCIENCE AND TECHNOLOGY.

This invention was additionally made with government support under Project No. 2E30600 awarded by the KIST Institutional Program funded by the Ministry of Science and ICT. The government support was made at a contribution rate of 10/100 for the research period of Jan. 1, 2020 through Dec. 31, 2020. The supervising institute was KOREA INSTITUTE OF SCIENCE AND TECHNOLOGY.

CROSS-REFERENCE TO RELATED APPLICATION

This application claims priority from Korean Patent Application No. 10-2020-0060703, filed on May 21, 2020, in the Korean Intellectual Property Office, the disclosure of which is incorporated herein by reference in its entirety.

BACKGROUND OF THE INVENTION

1. Field of the Invention

The present invention relates to a method and device for estimating a magnetic parameter value from a magnetic domain image using deep learning.

2. Description of the Related Art

A low-dimensional magnetic system is a subject that has been importantly researched due to scientific importance and potential application in next-generation electronic devices. For quantitative comprehension of the characteristics of such a magnetic structure, various theoretical methods including numerical analysis as well as experimental methods have been used. In general, all experimental factors cannot be considered in theoretical calculation, and therefore numerical analysis or an analytical approach cannot be directly compared with experimental results. Therefore, development of a method for directly converting data resulting from experimentation into various parameters that can be used in a theoretical approach is a problem that is important not only in magnetic research but also in other kinds of scientific research.

In contrast, machine learning, which appeared several decades ago for the first time, showed more improved performance and possibility than conventional techniques and thus has been adopted in various fields for various purposes. In particular, machine learning using a deep neural network, referred to as "deep learning," has been used in order to solve various scientific challenges, for example, in order to calculate ab initio of a many-electron system, to predict a protein structure, to solve a quantum many-body problem, and to investigate the ground state of a magnetic system.

SUMMARY OF THE INVENTION

The present invention has been made in view of the above problems, and it is an object of the present invention to provide a method and device for estimating a magnetic parameter value from a magnetic domain image using deep learning.

In accordance with an aspect of the present invention, the above and other objects can be accomplished by the provision of a magnetic parameter value estimation method using deep learning, the magnetic parameter value estimation method including creating a simulated magnetic domain image corresponding to a spin configuration of a two-dimensional magnetic system created through computer simulation, modeling a deep neural network using the simulated magnetic domain image, and estimating a magnetic parameter value of an observed magnetic domain image using the modeled deep neural network.

The magnetic parameter value may be at least one of Dzyaloshinskii-Moriya interaction (DMI) strength ($\vec{\beta}_{ij}$), perpendicular magnetic anisotropy strength (Kz), and dipole interaction strength (D) of magnetic Hamiltonian H defined by the following equation.

$$\mathcal{H} = -J \sum_{<i,j>} \vec{S}_i \cdot \vec{S}_j - \sum_{<i,j>} \vec{\beta}_{ij} \cdot \left(\vec{S}_i \times \vec{S}_j\right) -$$

$$K_z \sum_i \left|\vec{S}_{i,z}\right|^2 - D \sum_{i,j} \frac{3\left(\vec{S}_i \cdot \vec{r}_{ij}\right)\left(\vec{S}_j \cdot \vec{r}_{ij}\right) - \left(\vec{S}_i \cdot \vec{S}_j\right)\left|\vec{r}_{ij}\right|^2}{\left|\vec{r}_{ij}\right|^5}$$

(In the above equation, J indicates exchange interaction strength, i and j indicate two arbitrary positions in a two-dimensional magnetic system represented as a lattice structure, $\vec{S}_i$ indicates a normalized classical spin vector located at position i, $\vec{S}_j$ indicates a normalized classical spin vector located at position j, $\vec{S}_{i,z}$ indicates a component vector in an out-of-plane direction of a normalized classical spin vector located at position i, and $\vec{r}_{ij}$ indicates a non-dimensional displacement vector between position i and position j.)

The magnetic domain image creation step may include creating a spin configuration of the two-dimensional magnetic system through an annealing process using a Monte Carlo method and creating a magnetic domain image corresponding to the simulated spin configuration.

The annealing process using the Monte Carlo method may decrease temperature from a temperature higher than Curie temperature to a temperature at which there is no thermal fluctuation of spin.

The modeling step may model the deep neural network based on the difference between an estimated magnetic parameter value obtained by inputting the simulated magnetic domain image to the deep neural network and a true magnetic parameter value of the input simulated magnetic domain image.

In accordance with another aspect of the present invention, there is provided a magnetic parameter value estimation device using deep learning, the magnetic parameter value estimation device including an image creation unit configured to create a simulated magnetic domain image corresponding to a spin configuration of a two-dimensional magnetic system, a modeling unit configured to model a deep neural network using the simulated magnetic domain image, and an estimation unit configured to estimate a magnetic parameter value corresponding to an observed magnetic domain image using the modeled deep neural network.

The magnetic parameter value may be at least one of Dzyaloshinskii-Moriya interaction (DMI) strength ($\vec{\beta}_{ij}$), perpendicular magnetic anisotropy strength (Kz), and dipole interaction strength (D) of magnetic Hamiltonian H defined by the following equation.

$$\mathcal{H} = -J \sum_{<i,j>} \vec{S}_i \cdot \vec{S}_j - \sum_{<i,j>} \vec{\beta}_{ij} \cdot (\vec{S}_i \times \vec{S}_j) - K_z \sum_i |\vec{S}_{i,z}|^2 - D \sum_{i,j} \frac{3(\vec{S}_i \cdot \vec{r}_{ij})(\vec{S}_j \cdot \vec{r}_{ij}) - (\vec{S}_i \cdot \vec{S}_j)|\vec{r}_{ij}|^2}{|\vec{r}_{ij}|^5}$$

(In the above equation, J indicates exchange interaction strength, i and j indicate two arbitrary positions in a two-dimensional magnetic system represented as a lattice structure, $\vec{S}_i$ indicates a normalized classical spin vector located at position i, $\vec{S}_j$ indicates a normalized classical spin vector located at position j, $\vec{S}_{i,z}$ indicates a component vector in an out-of-plane direction of a normalized classical spin vector located at position i, and $\vec{r}_{ij}$ indicates a non-dimensional displacement vector between position i and position j.)

The image creation unit may be configured to create a spin configuration of the two-dimensional magnetic system through an annealing process using a Monte Carlo method and to create a magnetic domain image corresponding to the simulated spin configuration.

The annealing process using the Monte Carlo method may decrease temperature from a temperature higher than Curie temperature to a temperature at which there is no thermal fluctuation of spin.

The modeling unit may be configured to model the deep neural network based on the difference between an estimated magnetic parameter value obtained by inputting the simulated magnetic domain image to the deep neural network and a true magnetic parameter value of the input simulated magnetic domain image.

In accordance with a further aspect of the present invention, there is provided a computer-readable nonvolatile recording medium having the respective steps of the magnetic parameter value estimation method using deep learning recorded therein.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The above and other objects, features and other advantages of the present invention will be more clearly understood from the following detailed description taken in conjunction with the accompanying drawings, in which.

DETAILED DESCRIPTION OF THE PREFERRED EMBODIMENTS

Hereinafter, embodiments of the present invention will be described in detail with reference to the accompanying drawings.

In this specification, a "two-dimensional magnetic system" includes not only a two-dimensional system composed of Van der Waals materials having magnetic properties but also a quasi-two-dimensional (2D-like) system, such as a thin film structure, i.e. the case in which the magnetic properties of an upper surface and the magnetic properties of a lower surface are closely related with each other in the thickness direction (the perpendicular direction).

Figure 1:
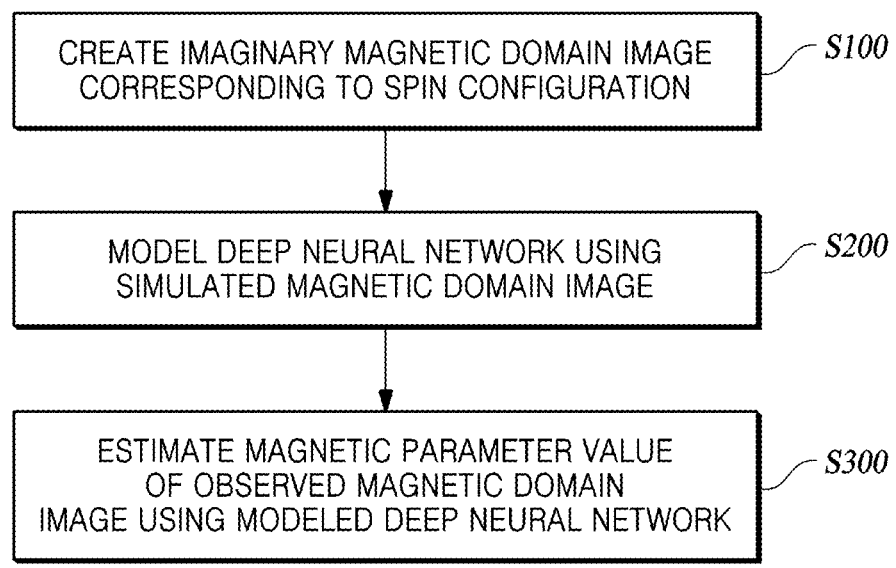
FIG. 1 is a flowchart showing a magnetic parameter value estimation method using deep learning according to an embodiment of the present invention.

FIG. 1 is a flowchart showing a magnetic parameter value estimation method using deep learning according to an embodiment of the present invention.

Referring to FIG. 1, the magnetic parameter value estimation method using deep learning includes a step (S100) of creating a simulated magnetic domain image corresponding to a spin configuration of a two-dimensional magnetic system, a step (S200) of modeling a deep neural network using the simulated magnetic domain image, and a step (S300) of estimating a magnetic parameter value of an observed magnetic domain image using the modeled deep neural network.

The magnetic parameter value may be at least one of Dzyaloshinskii-Moriya interaction (DMI) strength $\vec{\beta}_{ij}$ (simply referred to as $\beta$), perpendicular magnetic anisotropy strength Kz (simply referred to as K), and dipole interaction strength D of magnetic Hamiltonian H defined by the following equation.

$$\mathcal{H} = -J\sum_{<i,j>}\vec{S}_i\cdot\vec{S}_j - \sum_{<i,j>}\vec{\beta}_{ij}\cdot\left(\vec{S}_i\times\vec{S}_j\right) -$$

$$K_z\sum_i\left|\vec{S}_{i,z}\right|^2 - D\sum_{i,j}\frac{3\left(\vec{S}_i\cdot\vec{r}_{ij}\right)\left(\vec{S}_j\cdot\vec{r}_{ij}\right)-\left(\vec{S}_i\cdot\vec{S}_j\right)\left|\vec{r}_{ij}\right|^2}{\left|\vec{r}_{ij}\right|^5}$$

(In the above equation, J indicates exchange interaction strength, i and j indicate two arbitrary positions in a two-dimensional magnetic system represented as a lattice structure, $\vec{S}_i$ indicates a normalized classical spin vector located at position i, $\vec{S}_j$ indicates a normalized classical spin vector located at position j, $\vec{S}_{i,z}$ indicates indicates a component vector in an out-of-plane direction of a normalized classical spin vector located at position i, and $\vec{r}_{ij}$ indicates a non-dimensional displacement vector between position i and position j.)

Hereinafter, estimation of three values, such as DMI strength $\beta$, perpendicular magnetic anisotropy strength Kz, and dipole interaction strength D, as magnetic parameter values will be described.

Figure 2:
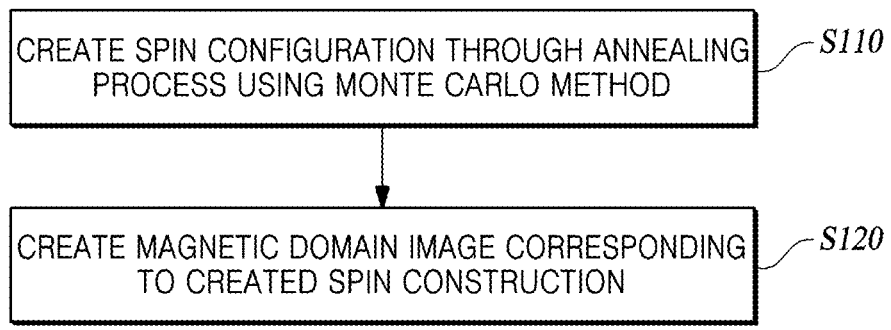
FIG. 2 is a view showing a concrete example of a magnetic domain image creation step of FIG. 1.

Referring to FIG. 2, the step (S100) of creating a magnetic domain image of FIG. 1 may include a step (S110) of creating a spin configuration of the two-dimensional magnetic system through an annealing process using a Monte Carlo method and a step (S120) of creating a magnetic domain image corresponding to the simulated spin configuration.

The annealing process using the Monte Carlo method means setting a spin direction using random numbers while gradually decreasing temperature in order to create a magnetic domain structure. Specifically, instead of precisely aligning each spin to a specific direction minimizing its local energy, a random number can be used to make the spin select a direction deviating from the specific direction. Using this method, we can control the thermal fluctuations of spins by varying the temperature of the system; the directions of spins changes randomly if the temperature of the system is above than Curie temperature, and they are aligned to the direction minimizing local energy in the case of low temperature. It is possible to obtain a simulated energy minimum state by an annealing process which the temperature slowly decreases from Curie temperature (random alignment of the spin direction by temperature fluctuations) to a low temperature (no fluctuation due to temperature). During the annealing process, a magnetic texture is formed due to spontaneous symmetry breaking, and therefore a magnetic domain and a magnetic domain wall have various morphological characteristics in the simulated spin configuration.

Figure 3:
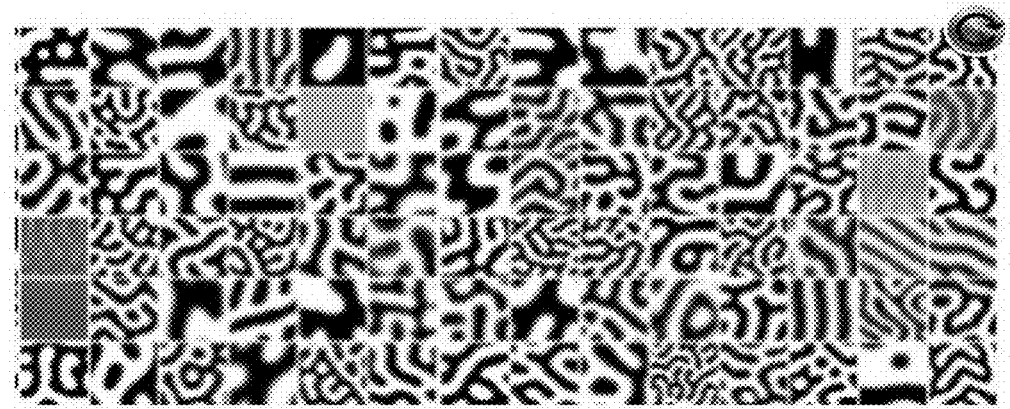
FIG. 3 is a view illustratively showing a plurality of simulated magnetic domain images according to an embodiment of the present invention.

FIG. 3 is a view illustratively showing a plurality of simulated magnetic domain images created in step S120 of FIG. 2.

As indicated by a color wheel at the right upper end of FIG. 3, a color mark may indicate an in-plane magnetization direction, and a black-and-white mark may indicate an out-of-plane magnetization direction. The magnetic domain structure obtained in step S110 may be expressed as a magnetic domain image in this manner.

Figure 4A:
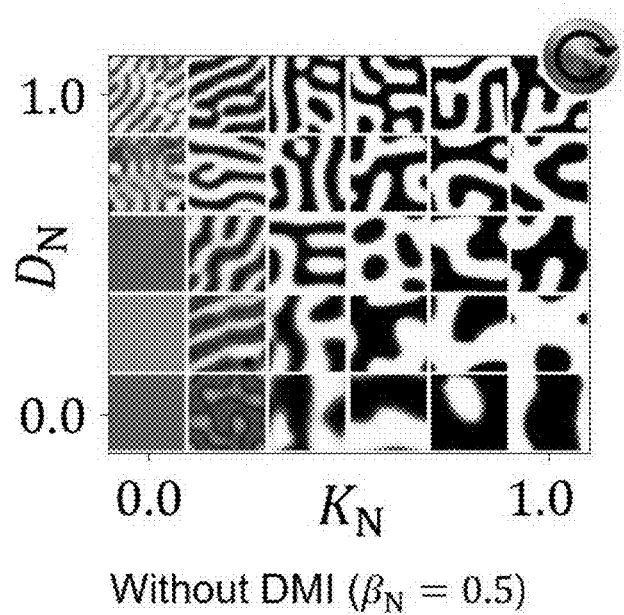
FIGS. 4A and 4B are views showing a magnetic domain image corresponding to a simulated spin configuration created by a Monte Carlo simulated annealing method.
Figure 4B:
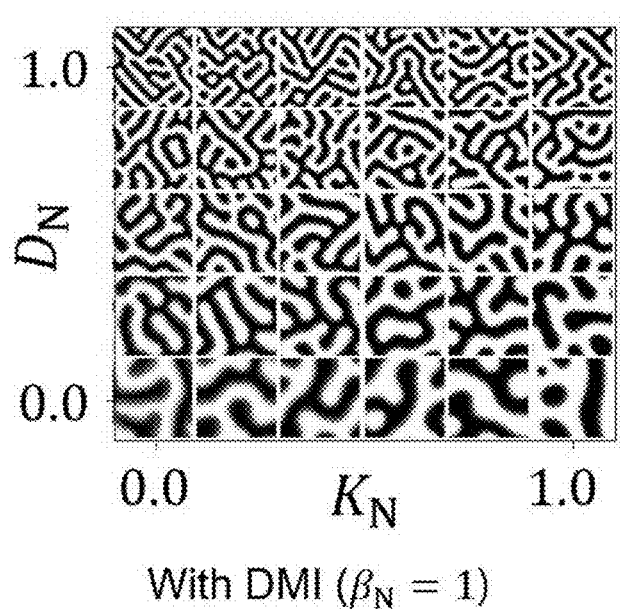

FIGS. 4A and 4B are views showing a magnetic domain image corresponding to a simulated spin configuration created by a Monte Carlo simulated annealing method.

Since the magnetic Hamiltonian parameters used to create the spin configuration have different ranges, normalized parameters pN, KN, and DN were defined using the relationship of $$Y_{i_N} = \frac{Y_i \sim Y_{i_{min}}}{Y_{i_{max}} - Y_{i_{min}}}$$

(where $Y_i$ indicates all of $\beta$, K, and D). Subscripts min and max indicate the minimum value and the maximum value of each magnetic Hamiltonian parameter range used to create the magnetic domain image.

A huge dataset including the magnetic domain structure and various spin configurations indicating magnetic Hamiltonian parameters corresponding thereto was created. In order to obtain a spin configuration that has appeared in a 100×100 square lattice system, an annealing process simulated using a Monte Carlo method was performed based on magnetic Hamiltonian of Equation (1)

Other parameters were scaled at ratios to J in the state in which J is fixed to 1. Other Hamiltonian parameters were changed when $\beta$=−3D to 3D, K=$K_{shape}$ to 1.2×$K_{shape}$ (where $K_{shape}$=2πD), and D=0.05 to 0.13, and therefore various magnetic domain sets were created in the 100×100 square lattice system. Step sizes used to change $\beta$, K, and D were 0.3D, 0.02×$K_{shape}$, and 0.005, respectively. 20 spin configurations were created using each magnetic Hamiltonian parameter set, and the total number of created spin configurations was about 80,000.

Since a magnetic domain shape is decided due to spontaneous symmetry breaking during the simulated annealing process, 20 spin configurations created using an identical magnetic Hamiltonian parameter set exhibit different magnetic domain shapes. This means that duplicate data are not essentially included in the entire dataset.

The temperature annealing speed of the simulated annealing process was intentionally adjusted such that a simulated spin configuration did not necessarily need to be a ground-state magnetic domain construction. A ground-state spin configuration is useful to extract the characteristics of a magnetic domain structure by training a network; however, a problem in that some structural features of a magnetic domain are overfit in a ground state may be caused. That is, when only the ground state is used, the network may not learn structural variety of the magnetic domain in the local energy minimum state.

FIGS. 4A and 4B show images sampled from a test dataset mapped in a $K_N$ and $D_N$ parameter space used to create each image. FIG. 4A shows the case in which $\beta_N$=0.5 and the case in which $\beta_N$=0.5, since $\beta$=0, i.e. $\beta_{min}$=−3D and $\beta_{max}$=3D.

Referring to FIG. 4A, when K is greater than shape anisotropy Ksha$_p$e that appears due to dipole interaction, i.e.

$K_N > 0$, an out-of-plane magnetic domain is formed. This result coincides with previous research showing formation of a striped magnetic domain satisfying the condition of $K > K_{shape}$. The trend in which the width of the striped magnetic domain was proportional to J/D was also provided in theoretical numerical calculation of previous research.

As shown in FIG. 4B, when DMI was present, the width of the magnetic domain was reduced compared to FIG. 4A, which coincides with the previous report. Consequently, it can be seen that, in the present embodiment, an appropriate magnetic domain was created in a parameter space used to create the spin configuration through a simulated annealing process.

Figure 5:
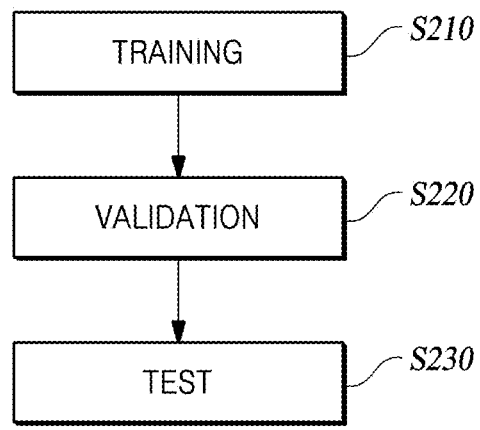
FIG. 5 is a view showing a concrete example of step S200 of FIG. 1.

FIG. 5 is a view showing a concrete example of step S200 of FIG. 1.

As shown in FIG. 5, the modeling step (S200) may include a training step (S210), a validation step (S220), and a test step (S230).

In the training step (S210), parameters in a deep neural network are decided for an input simulated magnetic domain image.

In the validation step (S220), the deep neural network is verified using data different from the input data used in the training step (S210). Consequently, it is possible to perform control such that the deep neural network is not overfit on the input simulated magnetic domain image in the training step (S210).

In the training step (S210) and the validation step (S220), the deep neural network may be modeled based on the difference between a estimated magnetic parameter value obtained from the simulated magnetic domain image created in step S100 to the deep neural network and an actual magnetic parameter value, i.e. a magnetic parameter value of a spin configuration corresponding to the input simulated magnetic domain image.

The test step (S230) is a step of testing the operation of the deep neural network modeled through the training step (S210) and the validation step (S220). It is possible to determine whether the deep neural network is normally operated through this step.

Figure 6:
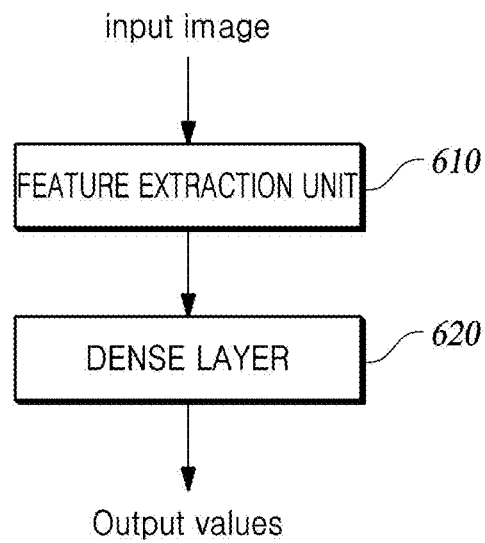
FIG. 6 is a view showing the structure of a deep neural network according to an embodiment of the present invention.

FIG. 6 is a view showing the structure of a deep neural network according to an embodiment of the present invention.

Referring to FIG. 6, the structure of the deep neural network according to the embodiment of the present invention may include a feature extraction unit 610 and at least one dense layer 620.

The feature extraction unit 610 may include at least one convolution layer and at least one subsampling layer. The feature extraction unit 610 performs convolutional calculation for an input magnetic domain image to extract a feature value of the input image.

For example, in order to estimate a magnetic Hamiltonian parameter from the magnetic domain image, a feature extraction unit having a ResNet50 network structure, which is a deep neural network structure capable of effectively extracting a feature from an image, may be used as the feature extraction unit 610.

The dense layer 620, which may also be referred to as a fully-connected layer, estimates a magnetic parameter value from the feature value extracted by the feature extraction unit 610.

Depending on embodiments, the feature extraction unit 610 and the dense layer 620 may decide a network parameter in the feature extraction unit 610 and the dense layer 620 based on the difference between a estimated magnetic parameter value obtained from the magnetic domain image to the deep neural network and a magnetic parameter value of the spin configuration created in the magnetic domain image creation step (S100).

For example, the feature extraction unit 610 and the dense layer 620 may decide a network parameter therein such that cost is minimized. The cost may be defined by the following equation.

$$\text{Cost} = \sum_i (y_i - Y_i)^2$$

In the above cost calculation equation, $y_i$ indicates a estimated magnetic parameter value obtained through the deep neural network, and $Y_i$ indicates a true magnetic parameter value of the spin configuration created in the magnetic domain image creation step (S100).

In order to avoid results from biased training due to the scale difference between the parameters at the time of cost calculation described above, normalized actual parameters $\beta_N$, $K_N$, and $D_N$ may be used as $Y_i$ of the above cost calculation equation. A normalization relationship that appears in the result part enables all normalized parameters to be changed from 0 to 1.

In an experimental example, the 20 spin configurations created using each magnetic Hamiltonian parameter set were divided into 14, 4, and 2 spin configurations for training, validation, and testing. The entire training, validation, and test dataset includes 56000, 16000, and 8000 spin configurations. One complete execution of a training process using the entire training dataset is defined as one epoch. A total of 1000 epochs were executed. The validation dataset was used to monitor the training process at the end of each epoch. After the entire training process, a trained neural network model having the smallest validation error value for the test process was selected.

Figure 7A:
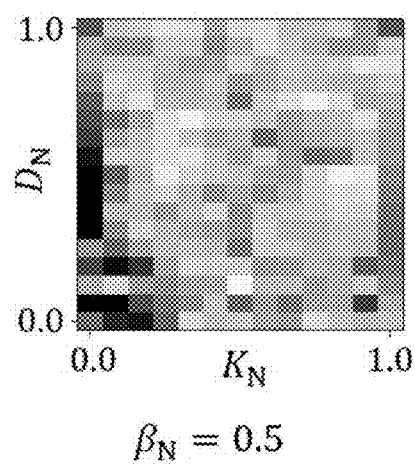
FIGS. 7A and 7B are views showing the test results of the deep neural network according to the embodiment of the present invention.
Figure 7B:
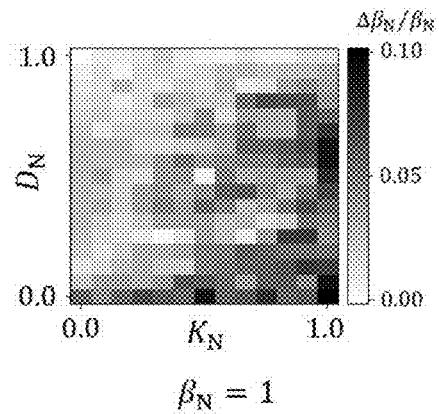
Figure 8:
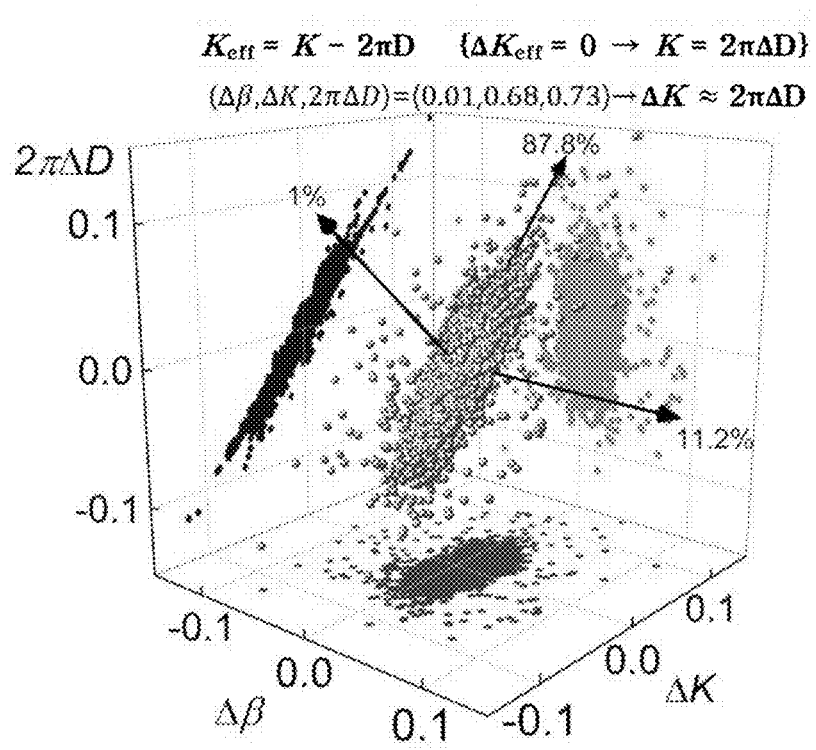
FIG. 8 is a view showing the test results of the deep neural network according to the embodiment of the present invention.

FIGS. 7 and 8 are views showing the test of the deep neural network modeled according to the embodiment of the present invention. After the training process, how well the trained network could estimate a magnetic Hamiltonian parameter from a magnetic domain image of the test dataset that has never been used during the training process was evaluated.

For direct comparison in the relationship between the characteristics of the input spin configuration and the estimated error amount, FIGS. 7A and 7B show heat map (also known as shading matrix) visualization of the estimated error amount $|\Delta\beta_N|$ of the DMI strength provided in the same $K_N$ and $D_N$ parameter spaces as in FIGS. 4A and 4B. Such a small $\Delta\beta_N$ value indicates that the estimation result closely approximates an actual magnetic Hamiltonian parameter value and that no meaningful difference can be made from the simulation result. Furthermore, it can be intuitively understood that the estimation result of β is inaccurate in some regions of the heat map. It is known that, in a two-dimensional out-of-plane magnetic system, DMI directly affects the characteristics of a magnetic domain wall. However, when the created spin characteristic has no magnetic domain structure, whereby no magnetic domain wall is formed (the dark region of FIG. 7A) or when the width of the magnetic domain wall structure is very narrow due to strong PMA (the dark region of FIG. 7B), the detailed structural characteristics of the magnetic domain wall cannot be extracted even by a well-trained network, which results in relatively less accurate DMI strength estimation.

In order to investigate whether there is a specific relationship between estimated error values of each parameter, pre-normalized estimated error values are provided in a three-dimensional space, as shown in FIG. 8. It can be seen that values are not distributed in a spherical shape but are located in a specific plane, from which it can be seen that a specific relationship exists between error values that clearly appear in a two-dimensional space, not a three-dimensional space. In order to investigate the specific relationship between error values, principal component analysis (PCA) was performed. PCA is a statistical procedure using orthogonal transformation in order to find a linear combination of variables that best preserves distribution of data, as a principal component. Black arrows of FIG. 8 indicate principal components of estimated error values based on PCA. This result indicates that a specific axis $\Delta K \approx 2\pi \times \Delta D$, which is a linear relationship between the error values of PMA and dipole interaction strength, is the most dominant principal component. When the definition of effective anisotropy $K_{eff}(=K-2\pi D)$ well known in the field of low-dimensional magnetic research is considered as an important reference based on which the characteristics of an out-of-plane magnetic domain structure are decided, this means that the deep neural network has spontaneously perceived the fact that, in order to predict a magnetic parameter value from a magnetic domain image, it is advantageous to minimize displacement of effective anisotropy ($\Delta K_{eff}=0 \approx \Delta K=2\pi\Delta D$), i.e. to accurately predict the value of effective anisotropy, through the training process. One of the main advantages of deep learning is that an effective method can be obtained through the training process without essential programming. Spontaneous recognition of importance of $K_{eff}$ by a neural network clearly describes the advantage of deep learning.

FIG. 9 is a view showing results obtained when a trained network was applied to an experimentally observed magnetic domain image in order to prove propriety and effectiveness of the network.

Figure 9A:
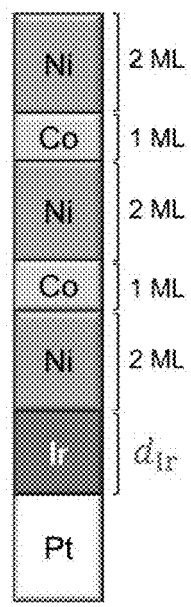
FIGS. 9A, 9B, 9C and 9D are views showing results obtained when the deep neural network according to the embodiment of the present invention was applied to an experimentally observed magnetic domain.
Figure 9B:
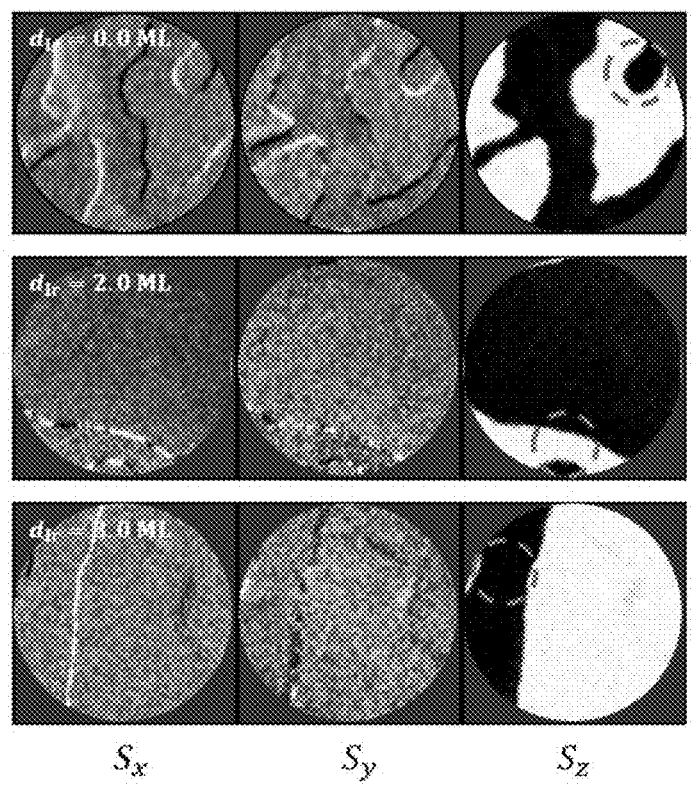
Figure 9C:
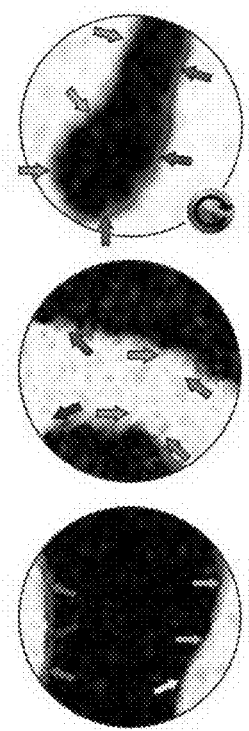

A trained network was applied to an experimentally observed magnetic domain image in order to prove propriety and effectiveness of the network. FIGS. 9A to 9C show spin-polarized low-energy electron microscopy (SPLEEM) images of a magnetic domain and a chiral magnetic domain wall of an Ni/[Co/Ni]$_2$/Ir/Pt (111) system (here, the effective size and symbol of DMI may be controlled by adjusting the thickness of an Ir layer). d$_{Ir}$ indicates the thickness of iridium in tomographic units (ML).

FIGS. 9B and 9C show original and pre-processed images of the magnetic domain and the magnetic domain wall observed by SPLEEM. The visual fields of FIGS. 9B and 9C are 10 um and 3 um, respectively. White/black of FIG. 9B correspond to magnetization based on +Sx/−Sx, +Sy/−Sy, and +Sz/−Sz, respectively. In FIG. 9C, a color wheel indicates an in-plane magnetization direction.

Figure 9D:
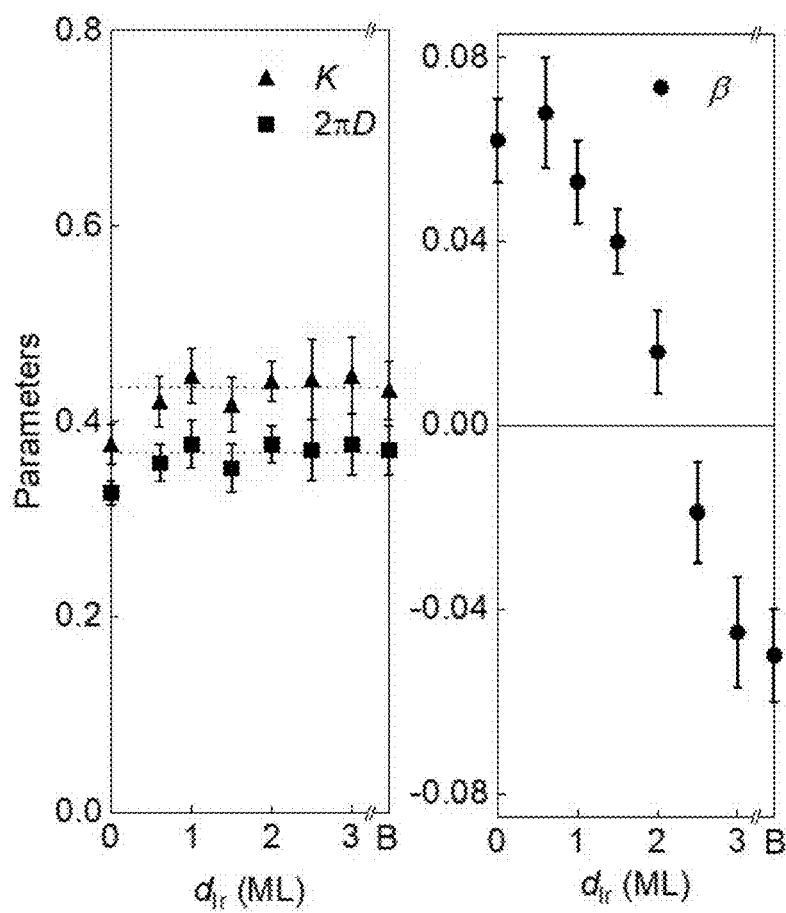

FIG. 9D shows K, D, and β values estimated by a network trained using SPLEEM images having various thicknesses of Ir. The letter B on the Ir-thickness axis indicates the case of bulk Ir decision.

The original experimental image was converted into a color image using the same color configuration table as the simulation results of FIGS. 9B and 9C. Some lower panels each having a pixel size of 100×100 were cut from a color pixel image having a pixel size of 370×400 so as to be used as input data of the trained network. The estimated DMI parameter was changed from a positive value to a negative value with increasing thickness of Ir, whereas the estimated K and D almost coincided with various thicknesses of Ir. This coincided with the result reported from experimental research, which reveals that the present invention is useful to extract a magnetic parameter from an experimentally observed magnetic domain.

Figure 10:
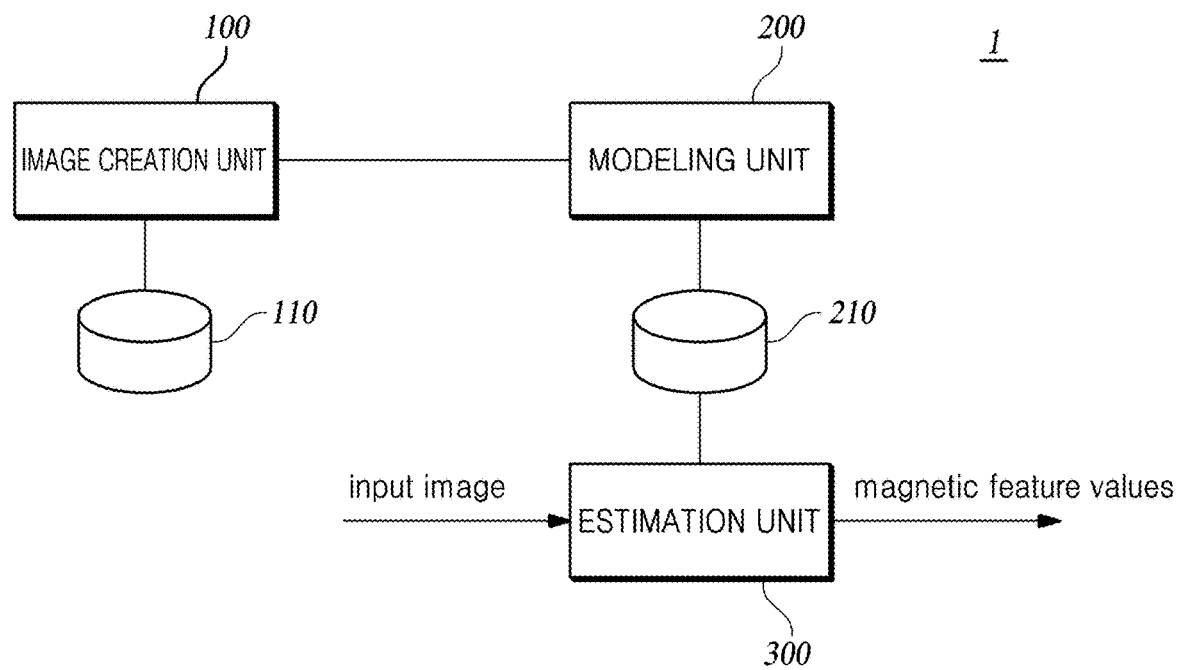
FIG. 10 is a view showing the construction of a magnetic parameter value estimation device using deep learning according to an embodiment of the present invention.

FIG. 10 is a view showing the construction of a magnetic parameter value estimation device 1 using deep learning according to an embodiment of the present invention.

Referring to FIG. 10, the magnetic parameter value estimation device 1 includes an image creation unit 100 configured to create a simulated magnetic domain image corresponding to a spin configuration of a two-dimensional magnetic system, a modeling unit 200 configured to model a deep neural network using the simulated magnetic domain image, and an estimation unit 300 configured to estimate a magnetic parameter value corresponding to an observed magnetic domain image using the modeled deep neural network.

The magnetic parameter value estimation device 1 may further include an image storage unit 110 configured to store a plurality of simulated magnetic domain images created by the image creation unit 100 and a neural network storage unit 210 configured to store a deep neural network.

Functions of the image creation unit 100, the modeling unit 200, and the estimation unit 300 correspond to the magnetic domain image creation step (S100), the modeling step (S200), and the magnetic parameter value estimation step (S300), respectively, and therefore a detailed description thereof will be omitted.

As is apparent from the above description, according to an embodiment of the present invention, it is possible to derive a magnetic parameter from a magnetic domain image.

Although the present invention has been described in detail based on preferred embodiments, those skilled in the art will appreciate that the present invention is not limited thereto and that various modifications, additions, and substitutions are possible without departing from the scope and spirit of the invention as disclosed in the accompanying claims. Consequently, the true technical protection scope of the present invention should be interpreted by the following claims, and all technical concepts included in a range equivalent thereto should be interpreted as falling within the scope of right of the present invention.

What is claimed is:
1. A method comprising:
a machine creating a simulated magnetic domain image corresponding to a spin configuration of a two-dimensional magnetic system created through computer simulation;
the machine modeling a deep neural network using the simulated magnetic domain image; and
the machine estimating a magnetic parameter value of a low-dimensional magnetic system by processing an experimentally observed magnetic domain image of the low-dimensional magnetic system using the modeled deep neural network, wherein the magnetic parameter value is at least one of Dzyaloshinskii-Moriya interaction (DMI) strength ($\vec{\beta}_{ij}$), perpendicular magnetic anisotropy strength (Kz), and dipole interaction strength (D) of magnetic Hamiltonian H defined by an equation below:

$$\mathcal{H} = -J\sum_{<i,j>} \vec{S}_i \cdot \vec{S}_j - \sum_{<i,j>} \vec{\beta}_{ij} \cdot \left(\vec{S}_i \times \vec{S}_j\right) -$$

-continued $$K_z \sum_i |\vec{S}_{i,z}|^2 - D \sum_{i,j} \frac{3(\vec{S}_i \cdot \vec{r}_{ij})(\vec{S}_j \cdot \vec{r}_{ij}) - (\vec{S}_i \cdot \vec{S}_j)|\vec{r}_{ij}|^2}{|\vec{r}_{ij}|^5}$$

wherein:
J indicates exchange interaction strength,
I and j indicate two arbitrary positions in a two-dimensional magnetic system represented as a lattice structure,
$\vec{S}_i$ indicates a normalized classical spin vector located at position i,
$\vec{S}_j$ indicates a normalized classical spin vector located at position j,
$\vec{S}_{i,z}$ indicates a component vector in an out-of-plane direction of a normalized classical spin vector located at position i, and
$\vec{r}_{ij}$ indicates a non-dimensional displacement vector between position i and position j; and
controlling DMI strength of a physical Ni/[Co/Ni]$_2$/Ir/Pt (111) system having an Ir layer by using the estimated DMI to adjust thickness of the Ir layer of the system.

2. The method according to claim 1, wherein the magnetic domain image creation step comprises:
creating a spin configuration of the two-dimensional magnetic system through an annealing process using a Monte Carlo method; and
creating a magnetic domain image corresponding to the simulated spin configuration.

3. The method according to claim 2, wherein the annealing process using the Monte Carlo method decreases temperature from a temperature higher than Curie temperature to a temperature at which there is no thermal fluctuation of spin.

4. The method according to claim 2, wherein the modeling step models the deep neural network based on a difference between a estimated magnetic parameter value obtained from the simulated magnetic domain image to the deep neural network and a magnetic parameter value of a spin configuration corresponding to the input simulated magnetic domain image.

5. The method of claim 1, wherein the experimentally observed magnetic domain image of the low-dimensional magnetic system is a spin-polarized low-energy electron microscopy (SPLEEM) image.

* * * * *